United States Patent Office

3,842,061
Patented Oct. 15, 1974

3,842,061
METHOD FOR ISOLATION OF ANTITHROMBIN FROM ANIMAL TISSUE MATERIALS BY ADSORPTION ON SULFATED CARBOHYDRATE GEL
Lars-Olof Andersson, Knivsta, and Maggie Miller Andersson, Jakobsberg, Sweden, assignors to AB Kabi, Stockholm, Sweden
No Drawing. Filed Sept. 6, 1972, Ser. No. 286,732
Claims priority, application Sweden, Sept. 8, 1971, 11,350/71
Int. Cl. C07g 7/00
U.S. Cl. 260—112 B
10 Claims

ABSTRACT OF THE DISCLOSURE

Antithrombin is isolated in practical and high yields from antithrombin-containing blood materials of blood-bearing animals by adsorption onto a water-insoluble gel matrix comprised primarily of cross-linked sulfated carbohydrate, followed by separation from the adsorbent.

---

The present invention is that of a method for isolating antithrombin in practical yields from an antithrombin-containing blood material, such as blood or blood products or fractions, of blood-bearing animals by adsorption on a water-insoluble gel matrix composed primarily of cross-linked sulfated carbohydrate, in a liquid system, and removing or separating the antithrombin from the adsorbent medium.

Blood coagulation is a complicated process involving a number of components. The formation of a clot can be induced by a number of different stimuli, the most frequent one being mechanical damage of one or several blood vessels. The initiation of the coagulation then takes place partly by contact activation of certain factors in the blood, and partly by tissue activators leaking out from the damaged site. The aggregation of blood clots, which takes place simultaneously, also affects that initiation.

A chain of reactions is started which finally results in the formation of a clot at the damaged site. One of the last and most important steps in the formation of a fibrin clot is the action of thrombin (an enzyme formed in the coagulation process) upon fibrinogen, whereby two small peptide fractions are split off from the fibrinogen, and yield a modified fibrinogen. This modified fibrinogen then quickly aggregates into a network, which is a clot.

In order to regulate the tendency of the blood to coagulate and to prevent a local coagulation from spreading and causing total intravascular coagulation, there are present in the blood several substances which exert an inhibiting effect on the coagulation. One of the most important of these is antithrombin, a protein, which reacts with and inactivates the thrombin. Thus, inactivated thrombin no longer can attack the fibrinogen, and the formation of clots is inhibited.

Pathologically reduced antithrombin levels have been observed in a number of conditions, combined with an increased risk of thrombosis, for example, after major surgery. There are reasonable indications that antithrombin therapy can become more valuable in the treatment of such cases. Reduced antithrombin levels also have been found in connection with the use of certain steroid drugs.

Relatively little has been done with antithrombin because the methods heretofore used to obtain it have been very complicated enabling its isolation only in trace quantities and thus giving very low yields of 1 to 2 percent. The method of the invention, described below, permits extraction of antithrombin in yields of more than 90 percent.

In connection with our experiments to isolate some coagulation factors from blood plasma, we tried to do so by adsorption on water-insoluble gels comprised primarily of sulfated polysaccharide, and unexpectedly found that certain specific coagulation factors are bound to these gels. Additional separation of the material by gel filtration enabled the isolation of a protein component having molecular weight of about 65,000 and a strongly pronounced inhibition of coagulation. Studies of this protein by physical-chemical and immunological techniques showed its identity with the earlier described antithrombin III.

Experiments with gradient elution of the adsorbate-holding water-insoluble cross-linked sulfated polysaccharide gel as held in the column supporting it, showed that antithrombin can be obtained directly and adequately separated from other proteins in the starting material. In order to obtain large quantities of antithrombin, it proved beneficial to adsorb it from the Cohn (method 6) fraction IV (Journal of the American Chemical Society, 1946, volume 68 page 459) as the starting material by addition of the water-insoluble gel comprised primarily of sulfated polysaccharide to a solution, generally aqueous, of this fraction. After completing the adsorption, the adsorbate-holding gel can be filtered off, washed free of adhering filtrate, and eluted. After gel filtration of the eluate on Sephadex G150 (an epichlorhydrin cross-linked dextran in bead form, from gel filtration chromatography, having a water-regain value of 15 ml./gm., i.e. milligrams per gram, of dry beads; a product of Pharmacia Fine Chemicals, of Piscataway, N.J., U.S.A. and Uppsala, Sweden), a pure antithrombin is obtained.

Considered broadly then, the invention is the method of isolating antithrombin from antithrombin-containing animal tissue material by contacting a water-insoluble gel matrix comprised primarily of cross-linked sulfated carbohydrate as an adsorbing agent with the antithrombin-containing tissue material in liquid form, with the adsorbing agent being in an amount sufficient to adsorb from at least about the major part of the antithrombin content of said tissue material to about substantially its entire content thereof, and for a time sufficient for that range of antithrombin to be adsorbed on said adsorbing agent; and separating the adsorbed antithrombin from the adsorbing agent.

The expression "antithrombin-containing blood material" is used herein and in the appended claims to embrace any blood material which contains antithrombin in a blood-bearing animal whether human or other mammal or any other animal. That expression then embraces primarily whole blood, blood serum, blood plasma, as well as any other antithrombin-containing fraction or fractions of human or bovine or other blood-bearing animal blood or of blood plasma, such as the aforesaid Cohn (method 6) fraction IV, as well as any other antithrombin-containing tissue of any blood-bearing animal. All of these parts and fractions of blood as well as of whole blood collectively are called blood materials.

Particularly suitable as the water-insoluble gel matrix adsorbents for use in the method of the invention are the water-insoluble gel-forming cross-linked sulfated polysaccharides such as (i) cross-linked dextran sulfate, (ii) cross-linked mixed dextran sulfate-agarose, (iii) cross-linked heparin, (iv) cross-linked mixed heparin-agarose, and (v) cross-linked mixed chondroitine sulfate-agarose. Agarose is recognized as being the sugar component of agar-agar.

The individual cross-linked dextran sulfate and the cross-linked heparin, and any such others that are cross-linked alone, conveniently are referred to singly as a uniform, water-insoluble sulfated polysaccharide gel adsorbent. These are prepared by addition of cyanogen bromide into an aqueous solution of the respective polysaccharide. Then by adjusting the pH to about 11, cross-links occur between the polysaccharide molecules and formation of the water-insoluble sulfated polysaccharide gel matrix results.

The water-insoluble mixed cross-linked sulfated polysaccharide and agarose gels (ii), (iv) and (v) are obtained by adding an aqueous solution of the respective sulfated polysaccharide to an agarose gel (SEPHAROSE 4B, a beaded agarose gel prepared from allowing a 4% aqueous solution of agarose to gel in bead form, a product of said Pharmacia Fine Chemicals) and followed by addition of cyanogen bromide and adjustment to about pH 11. These resulting water-insoluble, cross-linked agarose-admixed polysaccharide gels, conveniently called the agarose-admixed type, are easier to handle and provide higher flow rates than occur with the foregoing uniform type of gels.

The following examples serve to illustrate, but without restricting, the invention:

EXAMPLE 1

Cross-Linked Sulfated Dextran Antithrombin Isolation

To an aqueous solution of 100 ml. of dextran sulfate (20 mg. per ml.), 5 gms. of BrCN were added. The pH then was increased to 11.0 with 5 M NaOH for 7 minutes and the mixture was allowed to stand overnight under agitation. A white granular gel paste formed. This gel paste was packed into a small column of 5 mm. diameter by 8 cm., and was equilibrated with 0.02 M TRIS AMINO, 0.01 M sodium citrate, and 0.15 M NaCl buffer, at pH 8.5. 2 ml. of normal blood plasma was passed through the column. After its passage through the column, the plasma had lost its coagulability. TRIS AMINO is tris(hydroxymethyl)aminomethane.

The adsorbent gel column was washed first with the original buffer and then eluted by stepwise increase of the salt concentration to 1 M NaCl. The eluate contained material which, after dialysis agent phosphate buffer (pH 7.4), prolonged the coagulation time of the normal blood plasma after recalcification from 3 minutes to 45 minutes. Immunological analysis of the eluate showed the presence in it of antithrombin and trace amounts of some lipoproteins.

EXAMPLE 2

Adsorption From Plasma With Cross-linked Agarose-Admixed Dextran Sulfate, Followed By Gradient Elution The cross-linked agarose-admixed dextran sulfate adsorbent gel was prepared by mixing an aqueous solution of 30 ml. of dextran sulfate (15 mg./ml.), 50 ml. of the aforesaid Sepharose 4B agarose gel beads, and 1 gm. of BrCN, and adjusting the mixture to pH 11. The mixture was allowed to stand for 7 minutes under agitation, and the pH was maintained at 11 by continuous addition of NaOH. The addition of this alkali then was stopped and the pH dropped to 8.5 within 5 minutes. The agitation was continued at room temperature overnight and the resulting water-insoluble cross-linked agarose-admixed dextran sulfate then was water washed. A column was packed with cross-linked dextran sulfate-agarose gel thus obtained.

In the isolation adsorption step, 3 ml. of human normal blood plasma mixed 1:1 with the buffer (0.02 M TRIS AMINO, 0.01 M citrate, 0.15 M NaCl, for pH 8.5) was passed through that mixed gel in the column. After the passage through the column, the eluate was concentrated to 3 ml. volume and tested for its coagulation ability. During the passage through the column, the plasma had lost its ability to coagulate and was devoid of, inter alia, the coagulation factors VIII and IX. The material adsorbed on the gel was desorbed with 0.02 TRIS AMINO and 0.01 sodium citrate, pH 7.3, in a salt gradient from 0.15 M NaCl. The resulting eluate corresponded to about 2 percent of the starting material and consisted mainly of two components, one being a lipoprotein fraction of a pre-beta type and the other antithrombin III. The identification was performed by immunological and physical-chemical techniques.

EXAMPLE 3

Adsorption From Blood Plasma With Mixed Cross-Linked Dextran Sulfate-Agarose Gel, Followed By Stepwise Eluation, And Gel Filtration Adsorption on cross-linked agarose-admixed dextran sulfate gel was performed in the same way as in Example 2. The desorption was made in one step with 0.02 TRIS AMINO, 0.01 M Na-citrate, 1 M NaCl, pH 7.3 buffer. The desorbate was concentrated and subjected to gel filtration on the aforesaid Sephadex G150 epichlorohydrin cross-linked dextran in physiological phosphate buffer. Pure antithrombin was obtained in a fraction well separated from the lipoprotein fraction.

EXAMPLE 4

Adsorption From Blood Plasma With Mixed Cross-Linked Heparin Agarose Gel

Cross-linked agarose-admixed heparin adsorbent gel was prepared by the procedure described in Example 2 for the corresponding cross-linked agarose-admixed dextran sulfate gel, but instead of the dextran sulfate, 30 ml. of an aqueous heparin solution was used (5,000 IU/ml.). The resulting cross-linked agarose-admixed heparin gel was packed in a column as in Example 2 and the antithrombin isolation was carried out in the same way as in Example 2. The results obtained were similar to those given in Example 2.

EXAMPLE 5

Adsorption Isolation Of Antithrombin From Plasma Fraction, By Agarose-Admixed Dextran Sulfate Gel; And Stepwise Elution And Gel Filtration That antithrombin is present in the Cohn (method 6) fraction IV of blood plasma can be shown by using immunological methods. 135 gms. of this Cohn fraction IV in paste form were dissolved in 4 liters of the adsorption buffer and 500 ml. of the cross-linked agarose-admixed dextran sulfate gel were admixed. The mixture was slowly stirred for 1 hour while cooling, followed by decanting the supernatant solution and washing the absorbate-holding gel with adsorption buffer. The gel then was packed into a column, such as is used for an ion exchanger and eluted by increasing the NaCl concentration of the TRIS AMINO buffer pH 7.2 stepwise (0.5 M, 1M, and 1.5 M). The eluate which contained lipoprotein and antithrombin, was concentrated by ultrafiltration and further purified by gel-filtration on the earlier above-mentioned Sephadex G150. Identification of the antithrombin and purity controls were performed by immunological and physical-chemical techniques as used in the earlier examples.

EXAMPLE 6

Antithrombin From Normal Plasma By Cross-Linked Agarose-Admixed Chondroitine Sulfate Gel Cross-linked agarose-admixed chondroitine sulfate gel was prepared by mixing 250 mg. of chondroitine sulfate VI, 40 ml. of the earlier above-mentioned SEPHAROSE agarose gel beads, and 1 g. BrCN at pH 11. The mixture was allowed to stand at pH 11 for 7 minutes while that pH was maintained by continuous addition of a NaOH solution. Only a minor quantity of alkali was needed. After 7 minutes the pH cautiously was reduced to 8.5 by addition of acetic acid. Agitation at pH 8.5 was continued at room temperature overnight, following which the supernatant liquid was decanted, and the gel was washed as in the earlier examples. A column was packed with the resulting cross-linked agarose-admixed chondroitine sulfate gel and under the same conditions as described above 3 ml. of normal blood plasma diluted 1:1 with the same buffer were passed through the column, following which antithrombin was eluted from the gel by elution with the same elution buffer as in Example 1.

In any of the foregoing examples, the respectively used specific water-insoluble cross-linked sulfated polysaccharide gel, whether of the uniform type or the agarose-admixed type, can be replaced by at least the adsorption-capable equivalent amount of any of the other such water-insoluble sulfated poly-saccharide gels. For example, the cross-linked sulfated dextran of Example 1 can be replaced by the adsorption-capable equivalent amount of the water-insoluble cross-linked heparin gel.

This cross-linked heparin gel can be prepared by replacing the dextran sulfate of the first sentence of Example 1 by the equivalent amount of heparin and following the method of the first three sentences of that example.

Similarly, the water-insoluble cross-linked chondroitine sulfate gel can be prepared by replacing the dextran sulfate of Example 1 by the equivalent amount of chondroitine sulfate and following the method of the first three sentences of that example. The resulting corresponding adsorbent gel then can be used to isolate antithrombin by substantially the same method as used in Example 1.

Then too, the blood plasma fraction of Example 5 can be replaced by a similar amount of some other antithrombin-containing blood plasma fraction, and the antithrombin can be isolated from it by following the method of Example 5.

Then also, the plasma used in any of the other examples can be replaced by a suitable amount of some other antithrombin-containing blood material and the antithrombin can be isolated from it by substantially following the suitably applicable method of some one or more of these various examples.

While the invention has been explained by detailed description of certain specific embodiments of it, it is understood that various modifications or substitutions can be made in any of them within the scope of the appended claims which are intended also to cover equivalents of the specific embodiments.

What is claimed is:

1. The method of isolating antithrombin from an antithrombin-containing blood material, which comprises contacting a water-insoluble cross-linked sulfated polysaccharide gel matrix adsorbing agent with the anti-thrombin-containing blood material in liquid form, with the adsorbing agent being present in an amount sufficient to adsorb from at least about the major part of the antithrombin content of said blood material to about substantially its enire content thereof, and for a time sufficient for that range of antithrombin to be adsorbed on said adsorbing agent; and separating the adsorbed antithrombin from said adsorbing agent.

2. The method as claimed in claim 1, wherein the blood material is blood plasma.

3. The method as claimed in claim 1, wherein the blood material is an antithrombin-containing blood plasma fraction.

4. The method as claimed in claim 3, wherein the blood plasma fraction is the Cohn (method 6) fraction IV.

5. The method as claimed in claim 1, wherein the water-insoluble cross-linked gel-forming polysaccharide is (i) cross-linked dextran sulfate, (ii) cross-linked agarose-admixed dextran sulfate, (iii) cross-linked heparin, (iv) cross-linked agarose-admixed heparin, or (v) cross-linked agarose-admixed chondroitine sulfate.

6. The method as claimed in claim 1, wherein said cross-linking was provided by admixing the sulfated polysaccharide with cyanogen bromide under alkaline reaction conditions.

7. The method as claimed in claim 5, wherein said cross-linked sulfated polysaccharide is a uniform, water-insoluble sulfated polysaccharide gel adsorbent.

8. The method as claimed in claim 5, wherein said cross-linked sulfated polysaccharide is an agarose-admixed, water-insoluble sulfated polysaccharide gel adsorbent.

9. The method as claimed in claim 1, wherein the antithrombin is separated by treating the antithrombin-bearing adsorbent gel with an eluting solution compatible with the antithrombin and inert to the adsorbent gel.

10. The method as claimed in clim 9, wherein the eluting solution is an aqueous sodium chloride solution and which is used in increasing concentrations up to 1 molar.

References Cited

Chem-Abstracts, vol. 66, 1967, 540S–541S.
Introduction to Modern Biochemistry, 1968, Karlson et al., pp. 67–69.
Scand. Journal of Clinical Lab. Investigations, pp. 89–91, 1968, Abildgaard.
Chem-Abstracts, vol. 67, 1967, 78954S–Abildgaard.
Science, vol. 166 (1969), pp. 517–518, Mann et al.
Methods in Enzymology, vol. 19, pp. 915–924, Monk House, 1970.

HOWARD E. SCHAIN, Primary Examiner

U.S. Cl. X.R.

424—101

UNITED STATES PATENT OFFICE
CERTIFICATE OF CORRECTION

Patent No. 3,842,061    Dated  October 15, 1974

Inventor(s)   Lars-Olof Andersson et al.

It is certified that error appears in the above-identified patent and that said Letters Patent are hereby corrected as shown below:

Column 2, line 68, after "water-insoluble" insert -- cross-linked --. Column 3, line 37, "agent" should read -- against --. Column 4, lines 43-44, "absorbate" should read -- adsorbate --. Claim 10, line 1, "clim" should read -- claim --.

Signed and sealed this 11th day of February 1975.

(SEAL)
Attest:

RUTH C. MASON
Attesting Officer

C. MARSHALL DANN
Commissioner of Patents
and Trademarks

UNITED STATES PATENT AND TRADEMARK OFFICE

CERTIFICATE EXTENDING PATENT TERM
UNDER 35 U.S.C. 156

Patent No.    : 3,842,061

Dated         : October 15, 1974

Inventor(s)   : Lars-Olof Andersson et al

Patent Owner  : KabiVitrum AB

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

5 YEARS with all rights pertaining thereto as provided by 35 USC 156 (b).

I have caused the seal of the Patent and Trademark Office to be affixed this 7th day of December 1990.

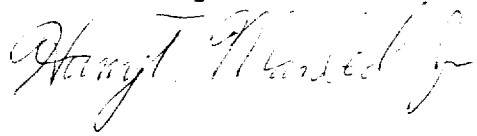

Harry F. Manbeck, Jr.
Assistant Secretary and Commissioner of Patents and Trademarks